Figure 1:
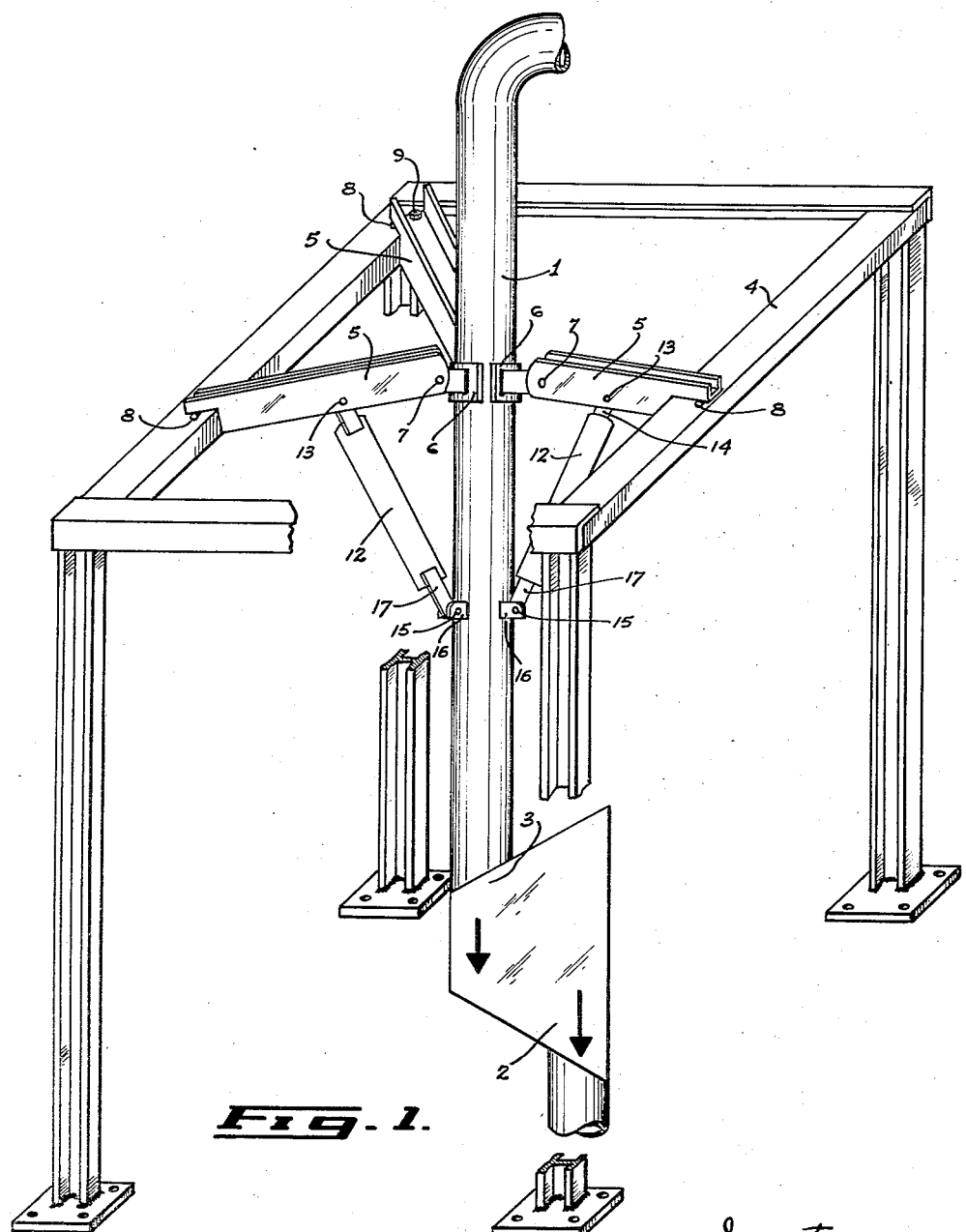

July 1, 1958 J. S. MOLONEY 2,841,347
COMPENSATING PIPE SUPPORT
Filed May 13, 1955 3 Sheets-Sheet 2

Inventor
John S. Moloney
by Stevens, Davis, Miller & Mosher
his attorneys

United States Patent Office 2,841,347
Patented July 1, 1958

2,841,347

COMPENSATING PIPE SUPPORT

John S. Moloney, Sarnia, Ontario, Canada, assignor to Polymer Corporation Limited, Sarnia, Ontario, Canada, a corporation of Canada Application May 13, 1955, Serial No. 508,169

6 Claims. (Cl. 248—49)

This invention relates broadly to a pipe support which nullifies the forces resulting from a contraction or an expansion of the pipe.

In the installation of steam lines, or any other lines carrying a fluid which is at a temperature substantially different from ambient temperature, it has been the custom to compensate for any thermal change in the dimension of the pipe by loops which are provided at intervals along their length. Such loops are normally provided in steam lines where the difference between ambient and operating temperatures is of the order of 700° F. They may also be used in refrigerant lines where the difference in temperature may be about 250° F. An expansion loop of this type and an anchor point are normally provided in the immediate vicinity of, for example, the turbine to which a steam line is connected. However, it was found that there must also be a means for avoiding the forces resulting from the thermal expansion of that part of the steam line between the anchor point and the turbine connection.

To solve this difficulty, it has been the custom in the past to employ a further expansion loop between the anchor point and the turbine connection. However, these loops occupy too much space and hamper the free movement of equipment and personnel about the turbine. It has also been suggested to use a bellows expansion joint, but these joints have been found to be undesirable under severe operating conditions.

It is the principal object of the present invention to provide a novel means of supporting the pipe in such a way that allowance is made for the thermal changes in dimension of the pipe.

It is also an object of the present invention to prevent the forces due to expansion or contraction of a pipe being transmitted to the connection between the pipe and the turbine or other apparatus to which the pipe is connected.

These and other objects are attained by supporting the pipe by means of a yieldable framework comprising an anchoring structure, a brace pivotally connected at one end to said pipe and at the other end to said anchoring structure, the angle between said brace and the line joining the point of no motion of the connected apparatus and the point of pivotal attachment of said brace to said pipe being substantially ninety degrees, a link pivotally connected at one end to a point between the ends of said brace and at the other end of said pipe at a point between the pivotal attachment of said brace to said pipe and the point of "no motion" of said apparatus, the line joining the point of pivotal attachment of said link to said brace and "hub point" being parallel to the line joining the point of pivotal attachment of said brace to said anchoring structure and the point of "no motion" of said apparatus. The "hub point" will be defined later.

The point of "no motion" of said apparatus is herein defined as that point in or near the centre of the base of the apparatus which for practical purposes may be considered not to move as expansion and contraction of the apparatus takes place. The motion of other points in the apparatus and adjacent connected piping due to expansion and contraction is referred to the point of no motion, being along radial lines whose centre for practical purposes may be considered to be the point of no motion.

In the preferred form of the invention, a plurality of such brace and link combinations is used at spaced intervals around the pipe, as will be described.

Figure 2:
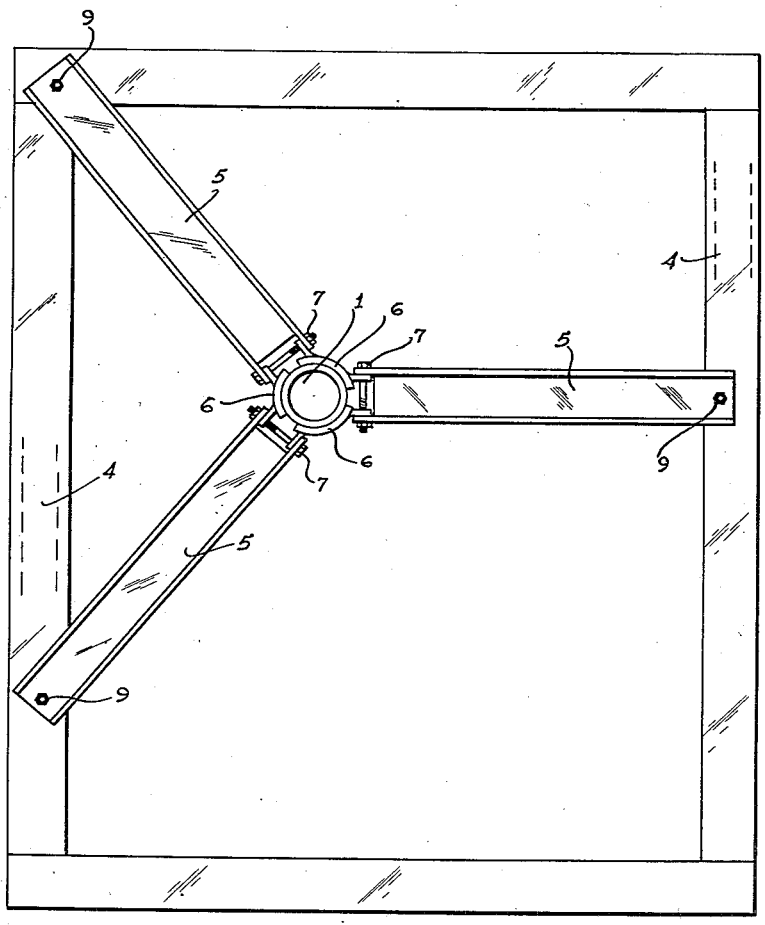
Figure 3:
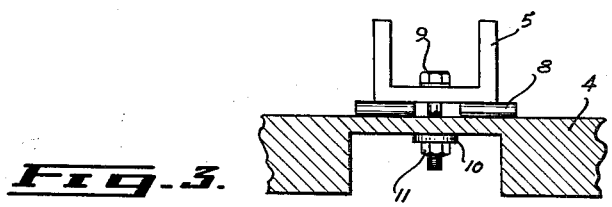
Figure 4:
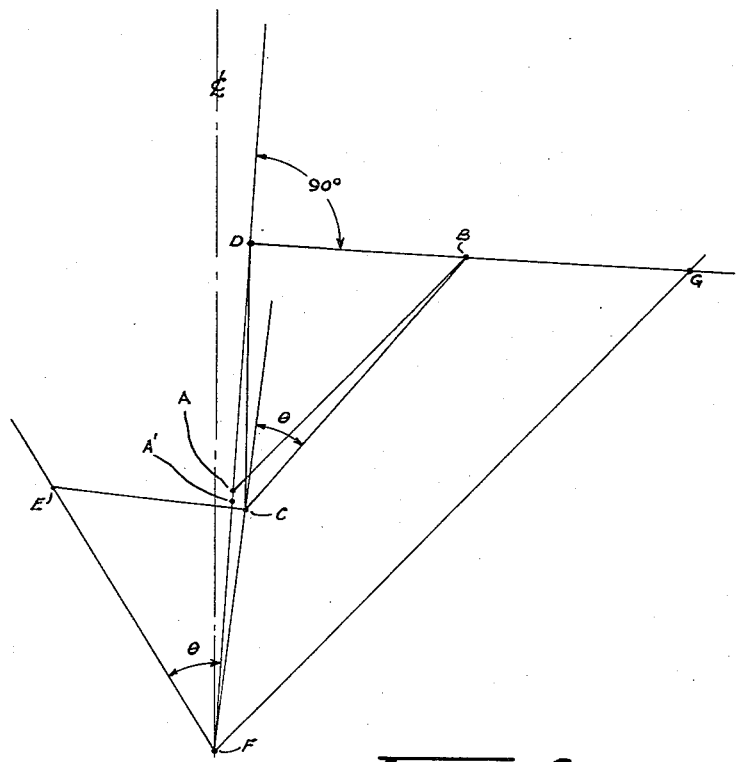

In drawings which illustrate diagrammatically an embodiment of the present invention, Fig. 1 is a partially sectionized general perspective view of the supporting means of a steam pipe connected to a steam turbine, Fig. 2 is a plan view showing the arrangement of the three braces about the steam pipe, Fig. 3 is a partial view of the manner of connection of the brace to the rigid structure and Fig. 4 is a diagrammatic representation showing a geometric method of determining the various points of attachment of the members of the framework.

In the drawings, a vertical steam pipe 1 is connected to a steam turbine 2, the connection being within the turbine casing. Reference numeral 3 designates the point of "no motion" of the turbine 2. The importance of the point of no motion, point 3, will appear later. The pipe 1 is supported in relation to a rigid anchoring structure 4 by means of braces 5. Braces 5, in the form of bars of H-shaped cross section are pivotally attached at one end to brackets 6 on the pipe 1 and pivotally attached at the other end to the rigid anchoring structure 4. The end of each brace 5 adjacent to the pipe 1 has two cooperating holes bored through the vertical part of the H below the horizontal cross rib and through which bolts 7 may pass. Bolts 7 also pass through cooperating holes in the bracket 6 so that brace 5 is pivotally attached to bracket 6. In order that the bolt 7 be allowed free movement through the said holes, a portion of the horizontal cross rib is cut away. The angle between the brace and the line joining the point of "no motion" of said apparatus and the point of pivotal attachment of said brace to said pipe, i. e., at bolt 7, is substantially ninety degrees.

At the other end of the brace the vertical parts of the H below the horizontal rib are cut away so that the brace assumes a U-shaped cross section. (See Fig. 3). Two cylindrical rollers 8 of relatively small diameter are permanently attached to the bottom surface of the horizontal rib of the brace so that when the brace is in position, rollers 8 are resting on the rigid anchoring structure 4. The brace 5 is permanently mounted on the rigid anchoring structure 4, by means of bolts 9 passing through the horizontal rib of the brace and through the structure, held in place by a resilient washer 10 and a nut 11.

Links 12 of right angled cross section and commonly known as angle iron are attached respectively to the braces 5 by means of bolts 13 passing through cooperating holes on the brace and on the plates 14 permanently attached to the links 12. These links are also pivotally attached to the steam pipe 1 by means of bolts 15 passing through cooperating holes in brackets 16, which are permanently attached to the steam pipe 1, and in plates 17 which are permanently attached to the links 12.

In operation, the expansion of the pipe 1 between brackets 6 and 16 causes the opposite angle of the triangle at bolt 13 to be increased because there is no corresponding increase in the lengths of the brace and link due to thermal expansion. The angle at bolt 15 remains virtually unchanged and the angle at brackets 6 must show a decrease corresponding to the increase in the angle at bolt 13. Since the longitudinal axis of the pipe 1 cannot change and the structure 4 is rigid, the small triangle formed by the pipe 1, brace 5 and link 12 causes the pipe 1 at the bracket 6 to move upward along its longitudinal axis as a result of the reduction in the angle between pipe 1 and brace 5. Due to the particular arrangement of parts to be described later, the said upward movement of the pipe 1 is sufficient to prevent any force being exerted at 3 due to the expansion of the pipe. A somewhat similar movement, only downward, is caused when the pipe 1 contracts and again no force is exerted at point 3.

The parts are arranged so that a line joining bolt 9 and point 3 is parallel to the line joining bolt 13 and the hub point, the triangles 9, 7, 3 (GDF in Figure 4) and 13, 7, "hub point" (BDA of Figure 4) thus created are similar triangles. Since these triangles must be similar it is manifest that the hub point must be accurately determined. "Hub point" is herein defined as the point A located by means of the geometric construction shown in Fig. 4. It is a certain calculated point on the line joining bolt 7 and point 3 close to the bolt 15.

The accurate geometric determination of the hub point is given in Fig. 4. In Fig. 4, A is the hub point, B is the bolt 13, C is the bolt 15, D is the bolt 7, F is the point 3 and G is the bolt 9. Preliminary design considerations make DG at right angles to FD and place C along a vertical line dropped from D. In other words DC is parallel to the centre line of the pipe. At this stage, therefore, the positions of points G, D, C, and F are known. It remains to determine the position of the so-called "hub point" A which will then give one the position of B. It is only when the point B is known that the link 12 can be put into position.

The sequence of steps to determine the point A is as follows:

(1) Estimate a first approximate position for A on the line DF in the vicinity of C.

(2) Draw a line through A parallel to line FG. The intersection of this line with line DG is the approximate position of B.

(3) Draw line CB to form angle $\theta$ between lines CB and FC extended.

(4) Construct the angle $\theta$ at F on line DF, that is, draw line EF with angle EFD equal to angle $\theta$.

(5) Construct CE perpendicular to CF.

(6) Draw a semicircle with a centre at the mid-point of EF through points E and F. The intersection of the semicircle with line DF is point A'.

Now estimate a second approximate position for A between A' and the first approximate position of A. Then repeat the above steps 2—6. Then repeat the whole procedure with any necessary further approximate positions of A between the last selected position for A and the last selected position for A' until point A' coincides with point A. This point of coincidence is the "hub point." Then AB is drawn parallel to FG to obtain the final position of B.

The following example is given to illustrate the values of the distances between bolts 7, 9, 13 and 15 in a typical installation.

*Example*

In the installation of a steam turbine, a 10" exhaust steam pipe was led vertically up from the turbine. A rigid anchoring structure 12' 10" long, 10' 9" wide and 11' high was erected to serve as the rigid anchoring structure designated in the drawings as 4. Three braces were then attached to the rigid anchoring structure 4 and the steam pipe 1, as indicated in the drawings. The distance between bolts 7 and 13 was 2' 6", while that between bolts 13 and 9 was 3' 4⁵/₃₂". The distance from the centre line of the steam pipe 1 to bolt 7 was 6½". The links were then attached to the steam pipe 1 and to the braces as shown in the drawings, with the distance between pins 13 and 15 being 4' 4⁵/₁₆". Pins 15 were also 6½" from the centre line of the 10" exhaust steam line. The distance between pins 7 and 15 was 3' 9¹⁵/₃₂". The distance between pins 15 and point 3 was 4' 8¹⁷/₃₂". Immediately below the bracket 16, the 10" pipe was reduced to a 6" pipe to correspond with the size of the turbine exhaust nozzle.

The manufacturer's specification of acceptable forces on the 6" nozzle was a maximum of 1,000 pounds force and 1,000 foot pounds moment. During use of this system according to the present invention at a temperature of about 500–700° F., there was no indication that either longitudinal force or moment had exceeded the maximum specifications given above. However, it was calculated that using the loop method of allowing for thermal expansion, a 40 foot loop would have been required.

Although the invention has been described using a plurality of brace and link combinations, and in particular, three of such combinations, it is of course possible to use only one or two such combinations. In these latter cases, it is necessary to support the pipe so that there should be no lateral movement. A suitable manner of restricting the movement of the pipe is by means of pipe guides permanently connected to the anchoring structure.

In the description of the attachment of the brace to the steam pipe, it was said that the angle between the brace and the line joining the point of no motion of said pipe to said apparatus and the point of pivotal attachment of said brace to said pipe was substantially ninety degrees. In this specification the term "substantially ninety degrees" is taken to mean those angles in the vicinity of ninety degrees which permit the required amount of vertical movement of the brace when it is moving to nullify the forces accompanying a thermal expansion or contraction of said steam pipe.

In the preferred form of the invention where none of said pipe guides are used, it is highly desirable that the spacing of the brace and link combinations around the circumference of the pipe be in accordance with the following limitations. First, that the adjacent combinations be substantially spaced apart around the circumference of the pipe. Secondly, that, in the case of more than two brace and link combinations being used, at least two combinations be located on opposite sides of the plane which includes the brace and link of a third combination.

What I claim is:

1. A yieldable framework for providing a pipe with a thermal compensating support adjacent to an apparatus to which the pipe is connected, said yieldable framework serving substantially to nullify the forces tending to be exerted on said apparatus during a thermal change in dimension of said pipe, comprising an anchoring structure, a brace pivotally connected at one end to said pipe and at the other end to said anchoring structure, the angle formed by said brace and the line joining the point of no motion of said apparatus and the point of pivotal attachment of said brace to said pipe being substantially ninety degrees, a link pivotally connected at one end to a point between the ends of said brace and at the other end to said pipe at a point between the pivotal attachment of said brace to said pipe and said point of no motion of said apparatus, the line joining the point of pivotal attachment of said link to said brace and "hub point" being parallel to the line joining the point of pivotal attachment of said brace to said anchoring structure and the point of no motion of said apparatus.

2. A yieldable framework for providing a pipe with a thermal compensating support adjacent to an apparatus to which the pipe is connected, said yieldable framework serving substantially to nullify the forces tending to be exerted on said apparatus during a thermal change in dimension of said pipe, comprising an anchoring structure, at least three braces, each pivotally connected at one end to said pipe and at the other end to said anchoring structure, the angle between each of said braces and the line joining the point of no motion of said apparatus and the point of pivotal attachment of each of said braces to said pipe being substantially ninety degrees, at least three links connected respectively to said braces, so as to form a plurality of brace and link combinations, each link being pivotally connected at one end to a point between the ends of the respective brace and at the other end to said pipe at a point between the pivotal attachment of the said respective brace to said pipe and the point of no motion of said apparatus, the lines joining the points of pivotal attachment of each of said links to the respective brace and the "hub point" being parallel to the lines joining the point of pivotal attachment of each of said braces to said anchoring structure and the point of no motion of said apparatus.

3. A yieldable framework as claimed in claim 2 in which said brace and link combinations are so arranged around the pipe that adjacent combinations are substantially spaced apart and at least two combinations are located on opposite sides of the plane which includes the brace and link of a third combination.

4. A yieldable framework for providing a pipe with a thermal compensating support on an apparatus to which the pipe is connected, said yieldable framework serving substantially to nullify the forces tending to be exerted on said apparatus during a thermal change in dimension of said pipe, comprising an anchoring structure, three braces, each pivotally connected at one end to said pipe and at the other end to said anchoring structure, the angle formed by each of said braces and the line joining the point of no motion of said apparatus and the point of pivotal attachment of each of said braces to said pipe being substantially ninety degrees, three links connected respectively to said three braces so as to form three brace and link combinations, each link being pivotally connected at one end to a point between the ends of the respective brace and at the other end to said pipe at a point between the pivotal attachment of the said respective brace to said pipe and the point of no motion of said apparatus, the lines joining the points of pivotal attachment of each of said links to the respective brace and the "hub point" being parallel to the lines joining the point of pivotal attachment of each of said braces to said anchoring structure and the point of no motion of said apparatus.

5. A yieldable framework as claimed in claim 4 in which said brace and link combinations are so arranged around the pipe that adjacent combinations are substantially spaced apart and two combinations are located on opposite sides of the plane which includes the brace and link of the third combination.

6. A yieldable framework for providing a steam pipe with a thermal compensating support adjacent to a steam turbine to which the pipe is attached, said yieldable framework serving substantially to nullify the forces tending to be exerted on said turbine during a thermal change in dimension of said pipe, comprising an anchoring structure, three braces each pivotally connected at one end to said steam pipe and at the other end to said anchoring structure, the angle between each of said braces and the line joining the point of no motion of said steam turbine and the point of pivotal attachment of each of said braces to said pipe being substantially ninety degrees, three links connected respectively to said three braces so as to form three brace and link combinations, each link being pivotally connected at one end to a point between the ends of the respective brace and at the other end to said steam pipe at a point between the pivotal attachment of the said respective brace to said steam pipe and the point of no motion of said steam turbine, the lines joining the points of pivotal attachment of each of said links to the respective brace and the "hub point" being parallel to the lines joining the point of pivotal attachment of each of said braces to said anchoring structure and the point of no motion of said steam turbine, the brace and link combinations being so arranged around the pipe that adjacent combinations are substantially spaced and two combinations are located on opposite sides of the plane which includes the brace and link of the third combination.

References Cited in the file of this patent

UNITED STATES PATENTS

| | | |
|---|---|---|
| 2,219,443 | Dunaway | Oct. 29, 1940 |
| 2,352,717 | Karlsson | July 4, 1944 |
| 2,509,503 | Huylon | May 30, 1950 |
| 2,533,370 | Haug | Dec. 12, 1950 |
| 2,561,540 | Sherbrooke | July 24, 1951 |
| 2,708,686 | Bernard et al. | May 17, 1955 |

FOREIGN PATENTS

| | | |
|---|---|---|
| 594,232 | Great Britain | Nov. 6, 1947 |